United States Patent [19]

Masumi et al.

[11] Patent Number: 5,519,739

[45] Date of Patent: May 21, 1996

[54] BOILING WATER TYPE THERMAL NEUTRON REACTOR AND ITS OPERATING METHOD

[75] Inventors: Ryoji Masumi, Hitachi; Motoo Aoyama, Mito; Junichi Koyama, Hitachi; Yoko Ishibashi, Hitachioota; Osamu Yokomizo, Tokai, all of Japan

[73] Assignee: Hitachi, Ltd., Tokyo, Japan

[21] Appl. No.: 297,040

[22] Filed: Aug. 29, 1994

[30] Foreign Application Priority Data

Sep. 20, 1993 [JP] Japan ..................... 5-232775

[51] Int. Cl.$^6$ ........................... G21C 7/32
[52] U.S. Cl. .................. 376/210; 376/352; 376/418
[58] Field of Search ..................... 376/210, 267, 376/349, 352, 362, 418, 444, 435

[56] References Cited

U.S. PATENT DOCUMENTS

| | | | |
|---|---|---|---|
| 4,293,380 | 10/1981 | Robbins | 376/209 |
| 4,851,181 | 7/1989 | Takeda et al. | 376/349 |
| 5,388,132 | 2/1995 | Aoyama et al. | 376/435 |

FOREIGN PATENT DOCUMENTS 63-82392  4/1988  Japan.

OTHER PUBLICATIONS

Mamoru Akiyama, Light Water Reactor, pp. 56–65, (no date).

Primary Examiner—Daniel D. Wasil
Attorney, Agent, or Firm—Fay, Sharpe, Beall, Fagan, Minnich & McKee

[57] ABSTRACT

The reactor shut-down margin and the thermal margin, as well as the output per unit volume of the core is increased. When A is the total cross sectional area of the non-boiling water areas in the channel boxes each surrounding a fuel assembly and non-boiling water areas outside the channel boxes and B is the cross sectional areas of boiling water areas in the channel boxes, the relation of $1 > B/(A+B) \geq 0.76$ is set. A control unit adjusts a rotational speed of a recirculation internal pump which controls the cooling water flow rate per unit area in the core section to $3.0 \times 10^3 \mathrm{t/h/m^2}$ at the beginning of the operation cycle and controls the cooling water flow rate per the unit area in the core cross section to $3.3 \times 10^3 \mathrm{t/h/m^2}$ at the end of an operation cycle.

11 Claims, 7 Drawing Sheets

BOILING WATER TYPE THERMAL NEUTRON REACTOR AND ITS OPERATING METHOD

DESCRIPTION OF THE INVENTION

1. Field of the Invention

The present invention relates to a boiling water type thermal neutron reactor (BWR) and its operating method, and more particularly to a boiling water type thermal neutron reactor suitable for generating a high capacity of electric power by providing an increase of a thermal margin and its operating method.

2. Prior Art

In conventional BWR cores, there are provided water gap areas filled with non-boiling water between abutting fuel assemblies that receive a group of cruciform control rods. These water gap areas have a width of about double that of the thickness of a control rod blade. A water rod filled with non-boiling water is provided in the central part of the fuel bundles so as to make the neutron distribution flat. The average ratio of hydrogen atoms to uranium atoms (hereinafter referred to as H/U ratio) of the core is adjusted to be in the range of 4 to 5 by providing these non-boiling water areas so that required uranium enrichment can be minimized. The main reason to adopt the average ratio is to save uranium resources.

In the above conventional technique, it is difficult to make the reactor shut-down margin larger, for example, when the excess reactivity is increased so as to extend fuel burnup greatly. As is disclosed in Japanese patent Laid-open print No. 63-82392, it is conceivable that the cross sectional area of each fuel assembly is made the square root of 2 times that of a conventional one, a fuel assembly is held by a couple of cruciform control rods with wide blades, and the control rods are inserted in both sides of the fuel assemblies in order to construct a large bundle core. In this conventional large bundle core, many water rods of a large diameter are arranged inside of the fuel assemblies to reduce sufficiently the velocity of the fission neutron. However, from the view point of conserving the thermal margin, it is not desirable that water which does not contribute to cooling exists in the fuel assemblies as stated above. So it is difficult to improve the economy by increasing the power density.

SUMMARY OF THE INVENTION

An object of this invention is to provide a boiling water type thermal neutron reactor and its operating method, wherein an output per unit volume of the core can be increased by increasing the reactor shut-down margin and the thermal margin.

This invention is concerned with a core which satisfies the relation of $1 > B/(A+B) \geq 0.75$, where A is the total cross sectional area of the non-boiling water areas including the water gap areas and the areas of the water rods and B is the cross sectional area of the boiling water areas which are formed outside the fuel rods and the water rods in a channel box. It is desirable to set the relation at $0.9 \geq 2B/(A+B) \geq 0.75$. Since a sufficient reactor shut-down margin is obtained in the above relation.

A feature of the operating method of this invention resides in that the coolant flow rate per unit area in the core cross sectional area is adjusted to be $3.0 \times 10^3 t/h/m^2 \sim 4.0 \times 10^3 t/h/m^2$ during at least one period of the operation cycle.

The flow rate of coolant per unit area in the core cross section is adjusted to be $3.0 \times 10^3 t/h/m^2 \sim 4.0 \times 10^3 t/h/m^2$ during at least one period of the operation cycle, so that a flow rate of the steam in the core outlet, that is, nuclear reactor power can be increased. This nuclear reactor power can be increased in such a manner that the flow area of the cooling water is increased sufficiently, thereby increasing the boiling water area by reducing the non-boiling water area that does not contribute to cooling. As a result, as is shown in FIG. 5, the flow rate of the cooling water can be made larger without increasing the pressure drop of the core.

By fulfilling the relation of $1 > B/(A+B) \geq 0.75$, the coolant flow rate per unit area in the transverse section of the core can be increased to be more than $3.0 \times 10^3 t/h/m^2$. It is possible to attain the reactor shut-down margin which is substantially equivalent to that of the conventional BWR by fulfilling the relation of $B/(A+B) \leq 0.9$.

DETAILED DESCRIPTION OF THE PREFERRED EMBODIMENTS

Figure 3:
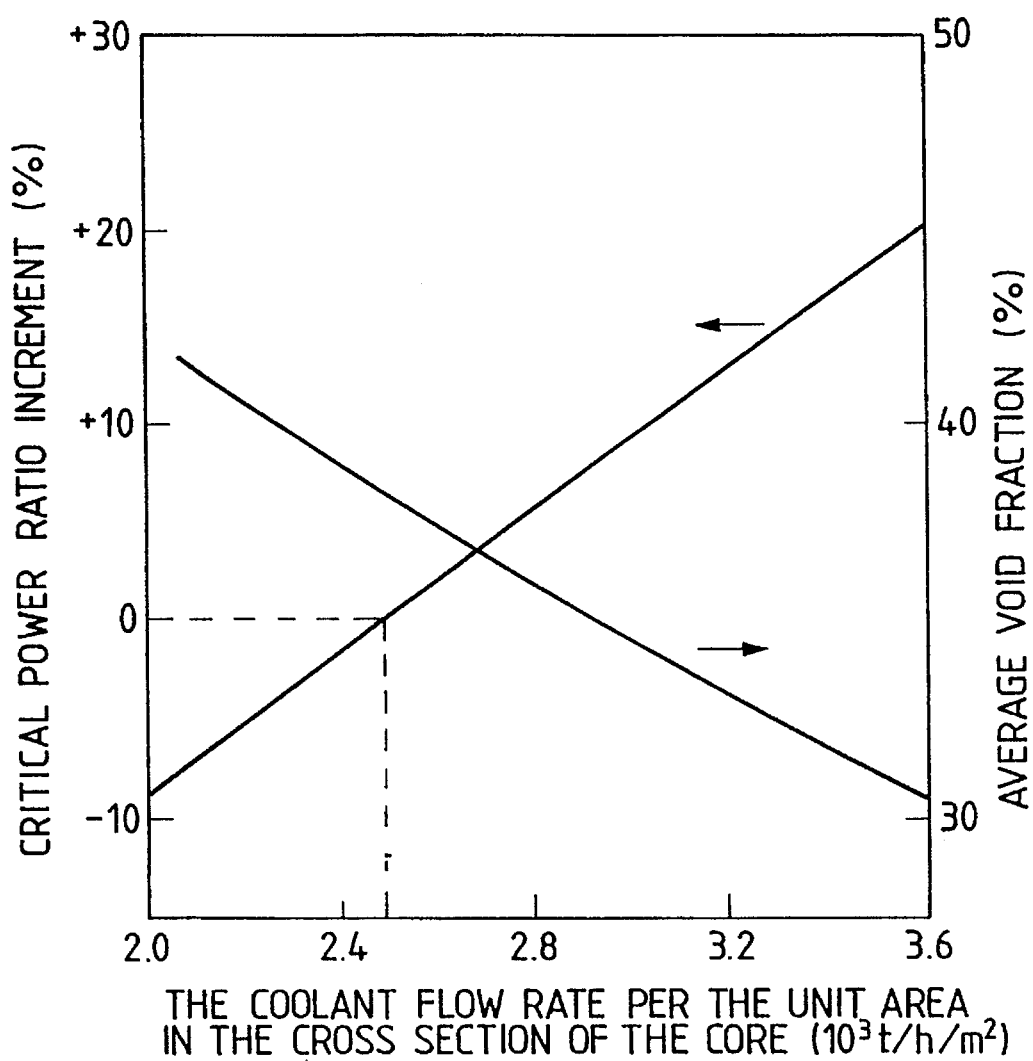
FIG. 3 is a characteristic figure that shows the relationship between the cooling water flow rate per the unit area of the cross section of the core and critical power ratio increment and the average void fraction.

As shown in FIG. 3, since the cooling water flow rate per unit area of the core cross section increases, a critical power ratio and a thermal margin also increases. When a thermal power of the reactor is increased by utilizing the obtained thermal margin in such a manner that the critical power ratio is kept constant, the steam flow rate at an outlet of the core that is equivalent to electric output increases with the increase of the cooling water flow rate per unit area of the core cross section.

Since it is common to provide a core inlet subcool to suppress the cavitation phenomenon in the recirculation pump or the recirculation internal pump, the cooling water reaches the exit of the core before boiling and the flow rate of steam decreases when the flow rate is increased excessively.

Figure 4:
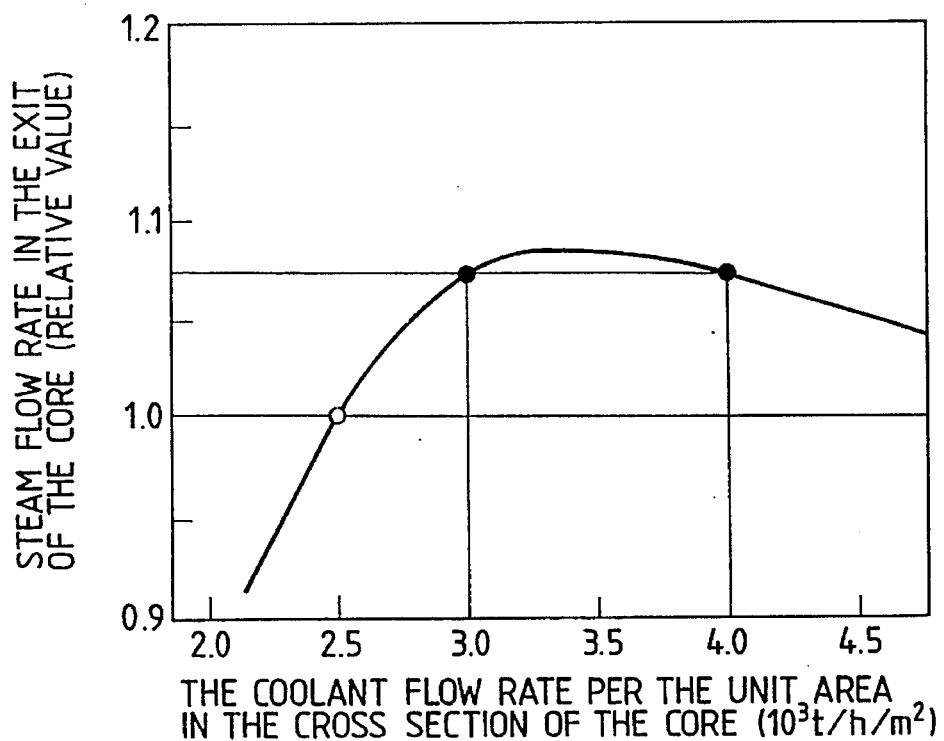
FIG. 4 is a characteristic figure that shows the relationship between the flow rate of cooling water per the unit area of the core cross section e and the steam in the outlet of the core with the flow rate.
Figure 5:
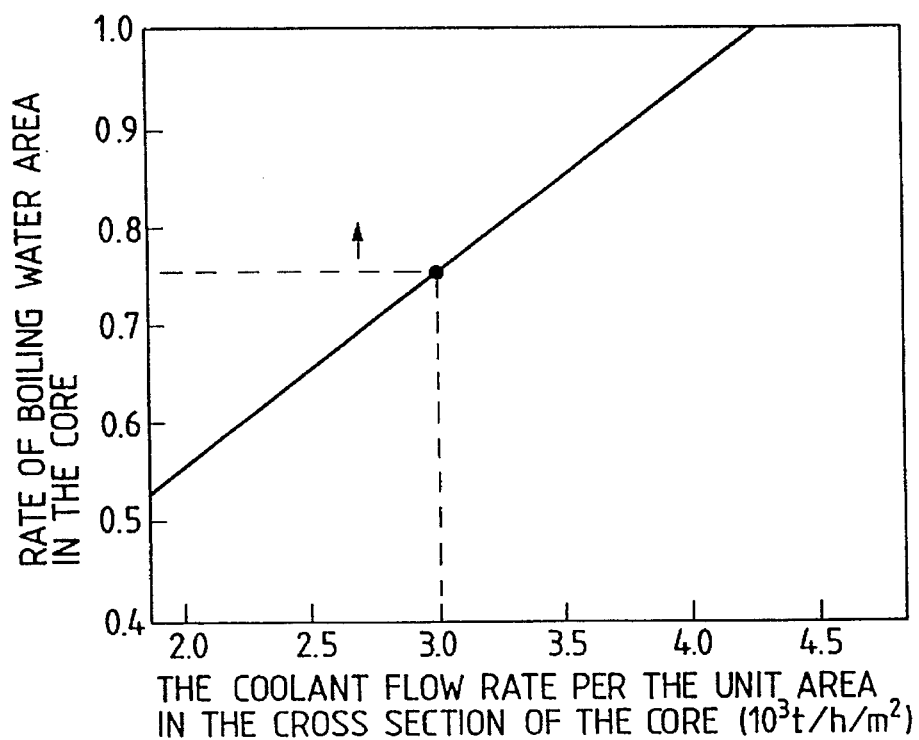
FIG. 5 is a characteristic figure that shows the flow rate of cooling water per the unit area of the core cross section and the relation with the area rate of boiling water.

From the above view points, the inventors consider that the maximum value should exist in the steam flow rate of the core outlet. As shown in FIG. 4, when a flow rate of the cooling water per unit area of the core cross section is in the range of $3.0 \times 10^3 t/h/m^2 \sim 4.0 \times 10^3 t/h/m^2$, the steam flow rate of the core outlet becomes approximately the maximum. In other words, the thermal margin is secured and the nuclear reactor power per the unit volume of the core can be increased by adjusting the cooling water flow rate per unit area of the core cross section so that the flow rate of cooling water becomes in the range of $3.0 \times 10^3 t/h/m^2 \sim 4.0 \times 10^3 t/h/m^2$.

EMBODIMENT 1

Figure 1:
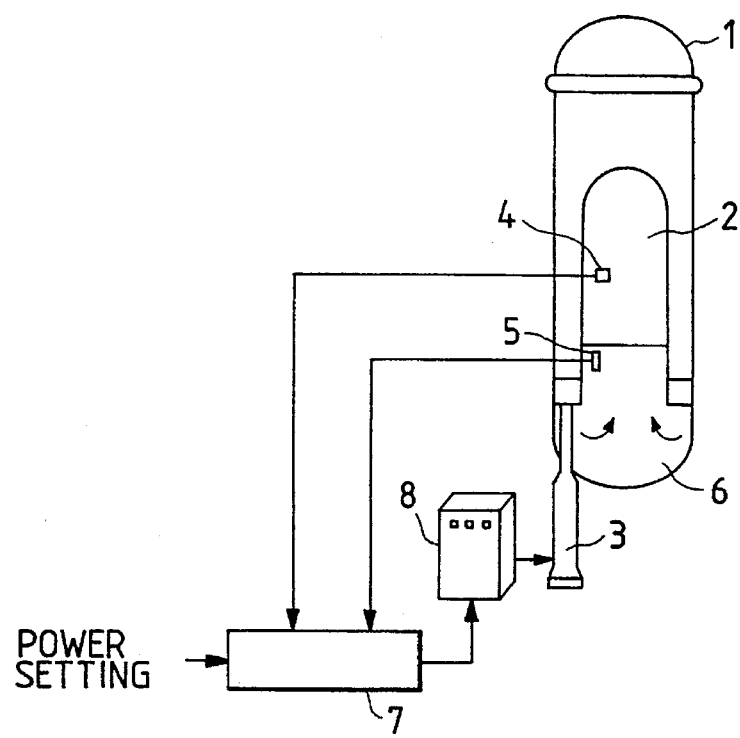
FIG. 1 is a block diagram of the boiling water type thermal neutron reactor to which this invention is applied.

The configuration of the boiling water type thermal neutron reactor and the operating method of the present invention will be explained by using FIG. 1.

In the boiling water type thermal neutron reactor, there are provided a core 2 inside of a nuclear reactor pressure vessel 1, and recirculation internal pump 3 that supplies cooling water to core 2. A plurality of fuel assemblies are loaded inside core 2. Neutron detector 4 is installed inside of core 2. Flowmeter 5 detects a flow rate (a flow rate in the core) of the cooling water discharged from recirculation internal pump 3.

A pressure of the cooling water rises by recirculation internal pump 3, and the cooling water enters core 2 through lower plenum 6. The flow rate of the cooling water supplied to core 2 is so adjusted that the rotational velocity of recirculation internal pump 3 becomes a set value. The rotational velocity of recirculation internal pump 3 is adjusted by controlling inverter power supply 8 based on the output of flowmeter 5, and the rotational velocity of recirculation internal pump 3 is adjusted by control unit 7 for controlling inverter power supply unit 8.

In this embodiment, the rated core flow rate at the beginning of the operation cycle is adjusted to $3.0 \times 10^3 t/h/m^2$ or more, and the maximum core flow rate at the end of the operation cycle is adjusted to $3.3 \times 10^3 t/h/m^2$ or more. They are the flow rates per unit cross sectional area of the part where the fuel assemblies are loaded in the core. In this embodiment, during the operation cycle, the flow rate of cooling water per unit cross sectional area is controlled to be $3.0 \times 10^3 t/h/m^2$. The operating cycle is the period from the start of the nuclear reactor to the stop for the refuelling.

The boiling water type thermal neutron reactor of this example is equipped with twelve recirculation internal pumps 3 that have a performance of about 40 meters of water head and about 800 kW output.

The detailed configuration of core 2 is explained below by using FIG. 2. Each of the fuel assemblies 9 is composed of fuel bundle 10, each being filled with fuel material composed of the enriched uranium oxide in the cladding tube of zircaloy. Each of the fuel assemblies is covered with a channel box 11 of a square pipe-form structural member having about 20 cm external widths and being made of zircaloy.

In order to control the excess reactivity and to stop the nuclear reactor safely, cruciform type control rods 13 each being constituted by bundled absorber rods 12 containing boron carbide are inserted between abutting fuel assemblies 9.

The diameter of fuel rod 10 is about 12 mm. The fuel pellet diameter is about 10 mm. The space between adjacent fuel rods 10 is about 15 mm. 169 fuel rods having an average uranium enrichment of about 6% are arranged in 13×13 lattice. The area ratio (hereinafter referred to as boiling water area ratio) of the boiling water area to the boiling area and the non-boiling water area is 0.76, which is larger than the area ratio of the C-lattice core of the conventional technique which is 0.68, to which the area ratio of a conventional large-bundle K-lattice core is approximately equal.

By this configuration, the coolant flow area becomes larger than that of the conventional technique. Therefore, the cooling water flow rate can be increased to $3.0 \times 10^3 t/h/m^2$ under the condition that the pressure drop of a core is constant. As shown in FIG. 3, when a coolant flow rate is further increased, the critical power ratio becomes larger, thereby to increase the thermal margin. That is, as shown in FIG. 4, the steam flow rate at the outlet which is equivalent to electric output can be set approximately maximum by utilizing the gained thermal margin.

When the cooling water flow rate is increased to $3.0 \times 10^3 t/h/m^2$ at constant thermal power, the steam flow rate is constant as steam flow rate is approximately proportional to thermal power. The average void fraction of the core is reduced with an increase in the liquid phase flow rate, and the void fraction at the core outlet (the upper part of the core) also is reduced. Because the void fraction at the core inlet (the lower part of the core) is approximately zero regardless of the flow rate, the larger the flow rate, the smaller the difference between the void fraction of the upper part of the core and that of the lower part.

The difference of the deceleration effect of the neutron becomes small, and the output distribution in the axial direction is flattened. In addition, the decreased average void fraction reduces to lower the reactivity increase at the cold condition also is reduced. Therefore the reactor shut-down margin becomes larger.

EMBODIMENT 2

Figure 6:
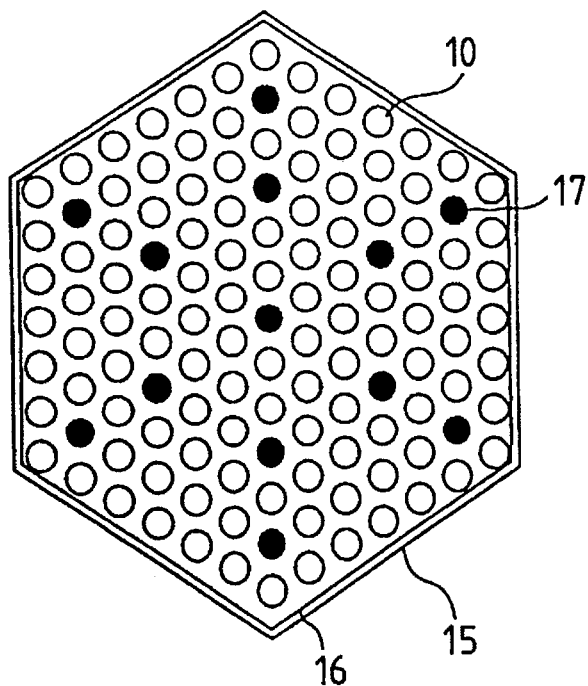
FIG. 6 is a longitudinal sectional view of the fuel assemblies that are loaded into the core of the boiling water type thermal neutron reactor to which this invention is applied.

Another embodiment of the boiling water type thermal neutron reactor of the present invention is explained below. The boiling water type thermal neutron reactor of this embodiment is composed of loaded fuel assemblies 15 of FIG. 6 instead of the structure of core 2 of FIG. 2. Fuel assemblies 15 are each composed in such a manner that many fuel rods 10 are arranged in an equilateral triangle grid-form in channel box 16 of the pipe-form of hexagonal cross section, and guide tubes 17 of control rods are arranged between fuel rods 10. The cluster control rods are inserted into respective guide tubes 17.

According to this embodiment, unlike embodiment 1, space for insertion of control rods outside the fuel assemblies is unnecessary. Thus, the rate of the boiling water area can be increased to 0.76 by reducing the rate of the non-boiling water area regardless of the size of the fuel assemblies. In the boiling water type thermal neutron reactor of this embodiment with this core, the flow rate in the core is adjusted by control unit 7 during the operating cycle from $3.0 \times 10^3 t/h/m^2$ (at the beginning of the cycle) to $4.0 \times 10^3 t/h/m^2$ (at the end of the cycle). In this example the similar effect as embodiment 1 is also obtained.

EMBODIMENT 3

Another embodiment of the boiling water type thermal neutron reactor using the C-lattice core is described where control rods are inserted into water gaps surrounding the fuel assemblies on the side facing one corner part of the fuel assemblies.

Figure 2:
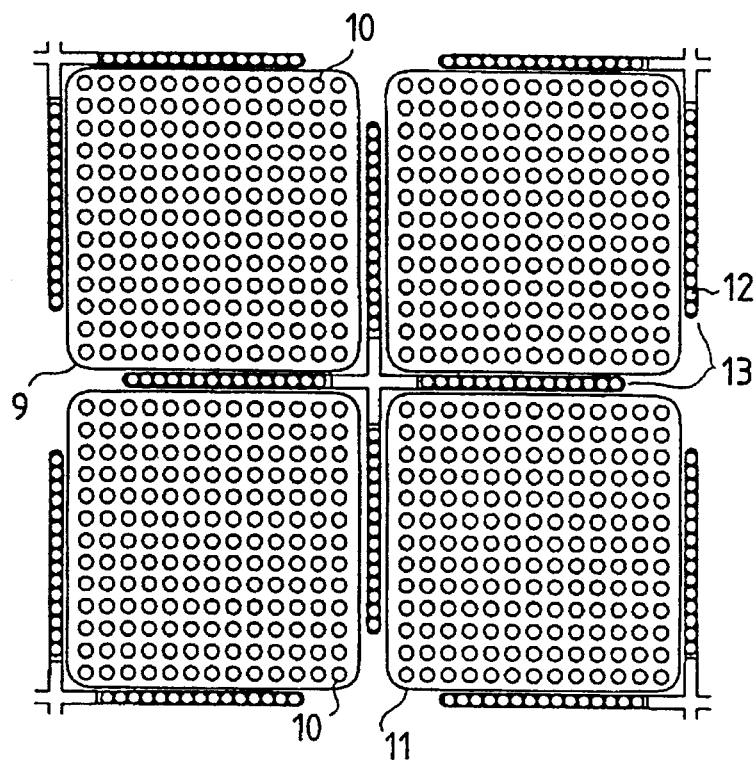
FIG. 2 is a partially transverse sectional view of the core of FIG. 1.
Figure 8:
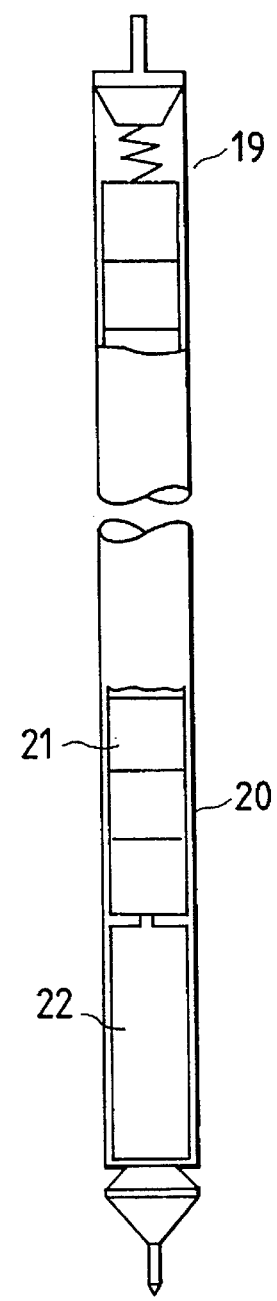
FIG. 8 is a longitudinal sectional view of the fuel rod shown in FIG. 7.
Figure 7:
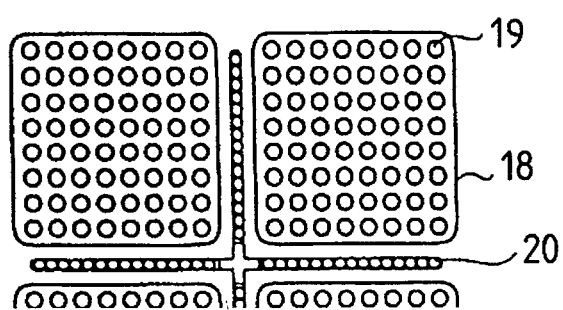
FIG. 7 is a partially transverse sectional view of the core of the boiling water type thermal neutron reactor to which this invention is applied.

As shown in FIG. 7, the C-lattice core is composed by loading the fuel assemblies 18 that have a cross sectional area obtained by dividing the cross sectional area of fuel assemblies shown in FIG. 2 by the square root of 2. Control rods 20 are inserted between four abutting fuel assemblies 18. As shown in FIG. 8, fuel pellets 21 are filled in sealed cladding tube 20 of fuel rods 19, and fission gas plenum 22 is formed at the lower end in cladding tube 20. The length of the axial direction of fission gas plenum 22 is 40 cm.

According to this embodiment, the length of the lower single-phase flow in fuel assemblies 18 having a relatively small pressure drop becomes large and the length of the two-phase flow part of which the pressure drop is relatively large becomes short, so the pressure drop of the core can be reduced by about 10%.

Control unit 7 controls the rotational velocity of recirculation internal pump 6 to keep the rated core flow to $3.0 \times 10^3 t/h/m^2$. In this embodiment the similar effect as that of example 1 is also obtained.

EMBODIMENT 4

Figure 9:
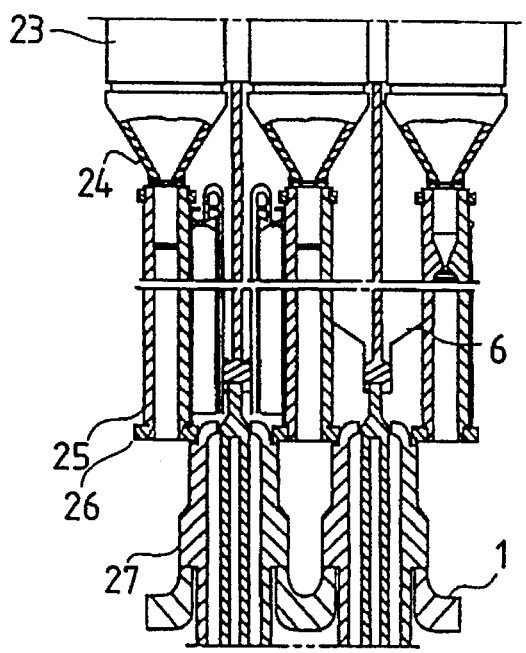
FIG. 9 is a longitudinal sectional view of the fuel assemblies and the fuel support structures installed in the core of the boiling water type thermal neutron reactor to which this invention is applied.

There is explained another example of the boiling water type thermal neutron reactor in which fuel assemblies 23 composed of a plurality of fuel rods each having a fission gas plenum at the upper end were loaded into the core. The core of this boiling water type thermal neutron reactor is the C-latticed core that is shown in FIG. 7. The support structure of the fuel assemblies is shown in FIG. 9. The lower tie-plates of fuel assemblies 23 are supported to fuel support pieces 24. Fuel support pieces 24 are inserted into the upper ends of cooling water guide tubes 25, and the lower ends thereof are installed in partition plate 26. Partition plate 26 is installed in each of housing 27 of control rods disposed in pressure vessel 1 of the nuclear reactor. Guide tube 25 for cooling water is smaller than each of the fuel assemblies in the cross sectional area. Cooling water is supplied through guide tubes 25 to fuel assemblies 23. By the inertia of the cooling water that flows through guide tube 25, the thermal hydraulic stability can be secured, and the pressure drop of the core can be reduced even if the cooling water entrance orifice aperture of fuel assemblies 23 is enlarged. In this embodiment, each pitch between fuel assemblies is about 15 cm, and an inner diameter of the guide tube for cooling water is about 5 cm.

By controlling the rotational velocity of recirculation internal pump 6, control unit 7 keeps the rated core flow to $3.0 \times 10^3 t/h/m^2$. Therefore, the thermal margin can be increased. The effect of this embodiment is similar to that of embodiment 1.

The techniques for lowering low-pressure loss in examples 3 and 4 are applicable to embodiment 1 and 2, so that a better effect will be obtained by increasing the thermal margin through the increase of the flow rate and the fuel inventory.

EMBODIMENT 5

Figure 10:
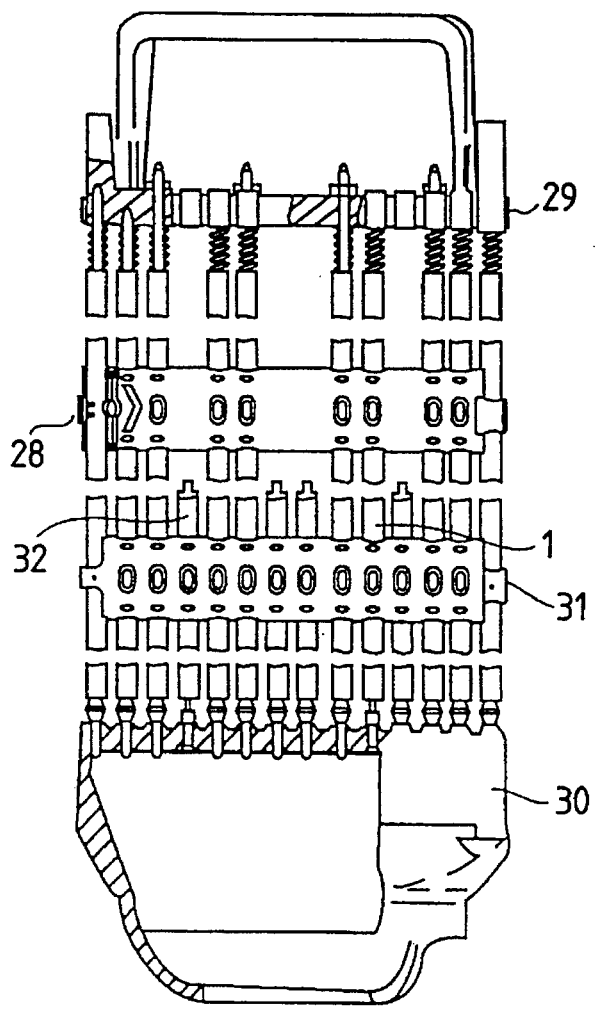
FIG. 10 is a longitudinal sectional view of the fuel assemblies installed in the core of the boiling water type thermal neutron reactor to which this invention is applied.

This example relates to a boiling water type thermal neutron reactor with the core loaded with fuel assemblies 28 of FIG. 10. Fuel assemblies 28 have upper tie-plate 29 and lower tie-plates 30, and the upper ends and the lower ends of fuel rods 1 are held in upper tie-plate 29 and lower tie-plate 30. A plurality of grid spacers 31 are arranged in the axial direction. Among fuel rods 1, fuel rods 32 are arranged. The length in the axial direction of the fuel rods 32 is shorter than that of fuel rods 1. By arranging the partially long fuel rods 32, the pressure drop can be made smaller than that of embodiment 1.

Also, in this type of boiling water type thermal neutron reactor, the cooling water flow rate is controlled like that of embodiment 1. In this example, the similar effect as achieved in embodiment 1 is expected.

EMBODIMENT 6

In embodiment 1, the thermal margin was increased by the increase of the flow rate of cooling water. When the power density is raised, the fuel economy may be lowered because the number of reload fuel must be increased if the fuel inventory is constant.

If the power density is raised to attain the fuel economy that is equivalent to that of the conventional technique, the specific power (thermal power per unit fuel weight) has only to be equal to that of the conventional technique. As shown in FIG. 4, by the increase of the cooling water flow rate, the power density can be increased by about 10%. The fuel inventory per unit volume has only to be increased by about 10% to keep the specific power constant in this case.

Figure 11:
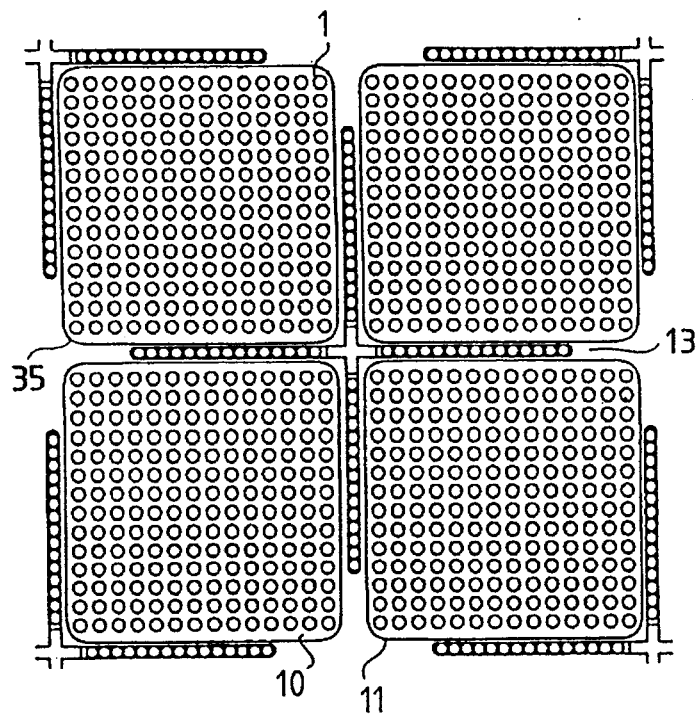
FIG. 11 is a sectional view of the core of the boiling water type thermal neutron reactor to which this invention is applied.

As shown in FIG. 11, when the unit area of the cross sectional area of the core and the rate of the non-boiling water area are made the same with those of example 1, and when part of the boiling water area is replaced with the fuel rods and the arrangement of the fuel rods is changed to a 14×14 lattice from a 13×13 lattice, the fuel inventory per unit volume of fuel assemblies 35 can be increased by about 10%. That is, the fuel inventory was increased to 2.6 kg/l from 2.4 which is presumed from the conventional technique disclosed in Japanese patent Laid-open print No. 63-82392. The ratio of the boiling water area is 0.68 which is equal to that of the conventional technique. The cooling water flow rate is controlled by control unit 7 to $3.0 \times 10^3 t/h/m^2$ per unit area of the core cross section.

Figure 12:
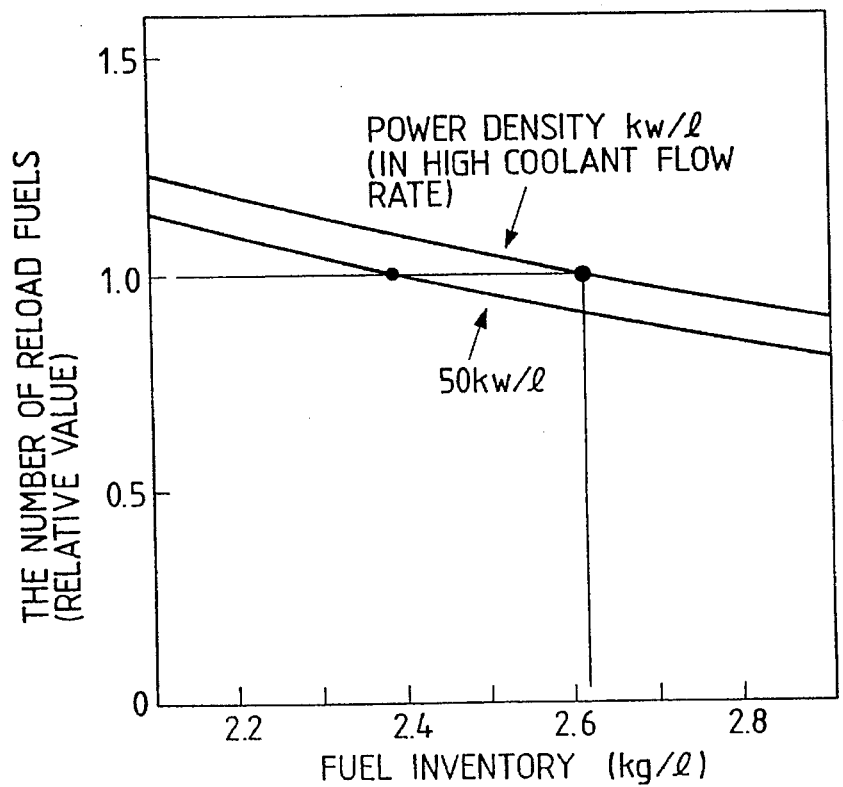
FIG. 12 is a characteristic figure that shows the relationship between the fuel inventory and the number of reload fuels.

By increasing the core flow rate of this embodiment as shown in FIG. 12, the power density is raised by about 10% to 55 kW/l from the conventional 50 kW/l. When the electric capacity is increased the number of reload fuels need not be increased. Therefore the fuel economy is equal to that of the conventional technique.

EMBODIMENT 7

Figure 13:
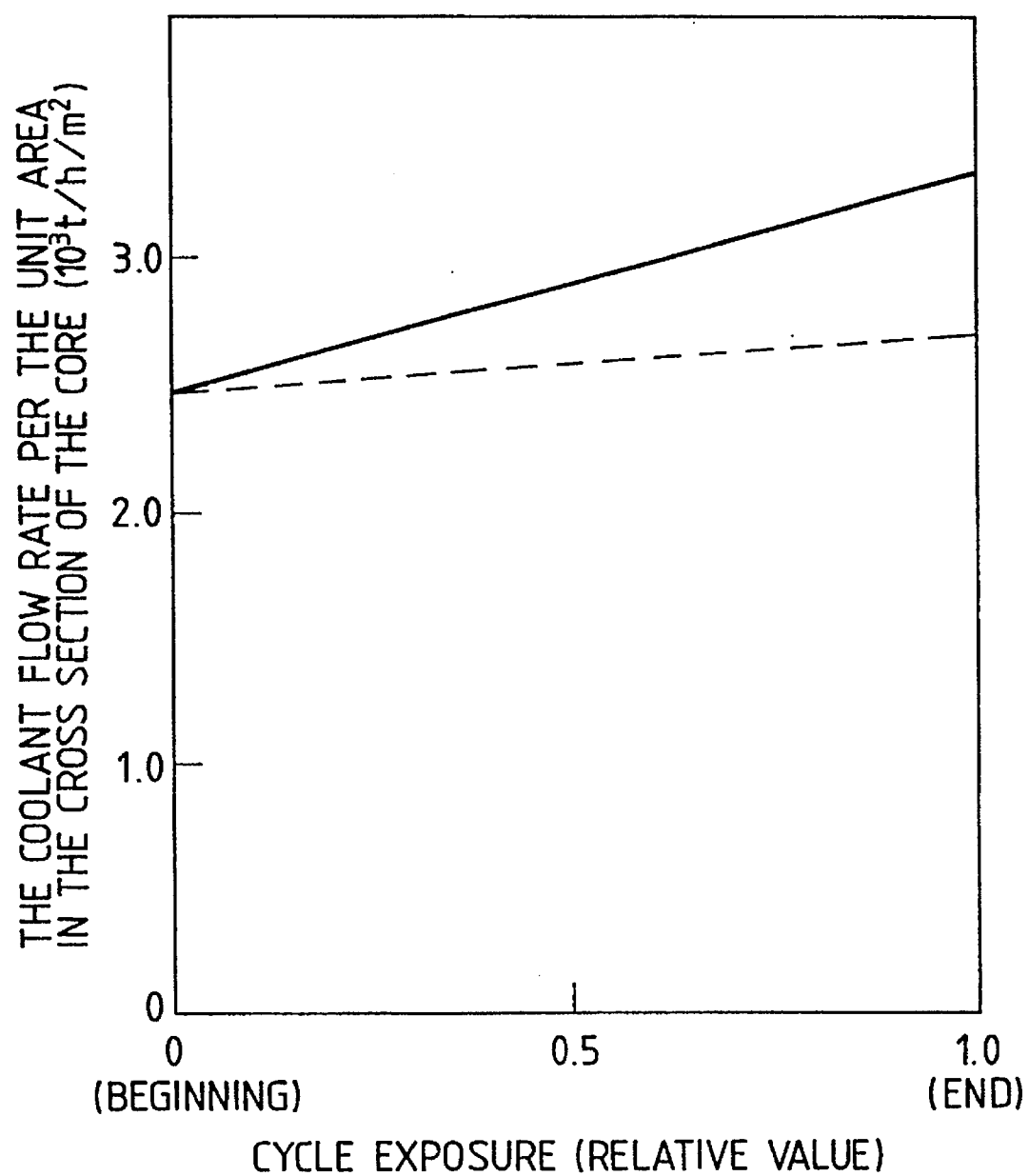
FIG. 13 is a characteristic figure that shows the relationship between the cycle exposure and the cooling water per unit area of the core cross section with the flow rate.

In the embodiments explained above, the cooling water flow rate and the thermal margin were increased from the beginning to the end through the operation cycle, compared to the conventional technique. However, in this example, as shown in FIG. 13, the cooling water flow rate at beginning of the operation cycle is about $2.5 \times 10^3 t/h/m^2$ which is equal to the conventional and the cooling water flow rate at the end of the operation cycle was controlled to about $3.3 \times 10^3$ t/h/m².

According to this embodiment, through the period of the operation cycle the thermal margin is secured while suppressing the pressure drop, it has the effect of saving uranium by excess reactivity control and the reactivity gain by the spectral shift.

What is claimed

1. A boiling water type thermal neutron reactor which comprises a reactor core including a plurality of fuel assemblies each being surrounded by a channel box and having a water rod inside thereof, wherein the core satisfies the following relation: $1 > B/(A+B) \geq 0.75$, wherein A is a total cross sectional area of water gap areas formed outside of the channel boxes and non-boiling water areas including non-boiling areas in said water rods, and B is a cross sectional area of boiling water areas formed outside of fuel rods installed in the fuel assemblies and said water rods in said channel boxes.

2. The boiling water type thermal neutron reactor as defined in claim 1, wherein the core further satisfies a relation: $0.9 \geq B/(A+B) \geq 0.75$.

3. The boiling water type thermal neutron reactor as defined in claim 1, wherein a fission gas plenum is provided in an internal lower end of said fuel rod.

4. The boiling water type thermal neutron reactor as defined in claim 1, further including control rod guides types into which cluster type control rods are inserted, said control rod quids types being arranged between the fuel rods.

5. The boiling water type thermal neutron reactor as defined in claim 1, wherein a coolant flow tube is provided below each said fuel assembly which directs coolant in each said fuel assembly.

6. The boiling water type thermal neutron reactor as defined in claim 1, wherein said fuel assembly comprises plurality of first fuel rods and a plurality of second fuel rods, a length of which in an axial direction is shorter said first fuel rods.

7. The boiling water type thermal neutron reactor as defined in claim 1, wherein an average loading quantity of the fuel heavy metal per the unit volume of said fuel assembly is more than 2.6 kg/l.

8. The boiling water type thermal neutron reactor as defined in claim 1, further including a plurality of control rods arranged between adjacent sides of said fuel assembly.

9. A method of operating a boiling water type thermal neutron reactor which comprises a reactor core including a plurality of fuel assemblies each being surrounded by a channel box and having a water rod inside thereof, where the core satisfies the following relation: $1 > B/(A+B) \geq 0.75$, wherein A is a total cross sectional area of water gap areas formed outside of the channel boxes and non-boiling water areas including non-boiling areas in said water rods, and B is a cross sectional area of boiling water areas formed outside of fuel rods installed in the fuel assemblies and said water rods in said channel boxes, wherein a coolant flow rate per unit area in the cross sectional area of said core is adjusted to $3.0 \times 10^3$ t/h/m²–$4.0 \times 10^3$ t/h/m² in at least one period of the operation cycle.

10. The method of operating a boiling water type thermal neutron reactor as defined in claim 9, including adjusting with a control unit a rotational speed of a recirculation internal pump to control the cooling water flow rate per unit volume in the cross sectional area of the core to at least $3.0 \times 10^3$ t/h/m² at a beginning of an operation cycle and to control the cooling water flow rate per unit volume in the cross sectional area of the core to be at least $3.3 \times 10^3$ t/h/m² at an end of an operation cycle.

11. A method of operating a boiling water type thermal neutron reactor which comprises a reactor core including a plurality of fuel assemblies each being surrounded by a channelbox and having a water rod inside thereof wherein A is a total cross sectional area of non-boiling water areas in the channel boxes each surrounding a fuel assembly and non-boiling water areas outside the channel boxes and B is a cross sectional area of boiling water areas in the channel boxes and a relation of $1 > B/(A+B) \geq 0.76$ holds, wherein said method includes adjusting, by a control unit, a rotational speed of a recirculation internal pump which controls a cooling water flow rate per unit volume in a cross sectional area of the core to be $3.0 \times 10^3$ t/h/m² at a beginning of an operation cycle of the core and controlling the cooling water flow rate per unit volume in the cross sectional area of the core to be $3.3 \times 10^3$ t/h/m² at an end of an operation cycle.

\* \* \* \* \*